May 18, 1948.   W. J. KROLL   2,441,770
PROCESS FOR MAKING IRON POWDER
Filed Nov. 11, 1944
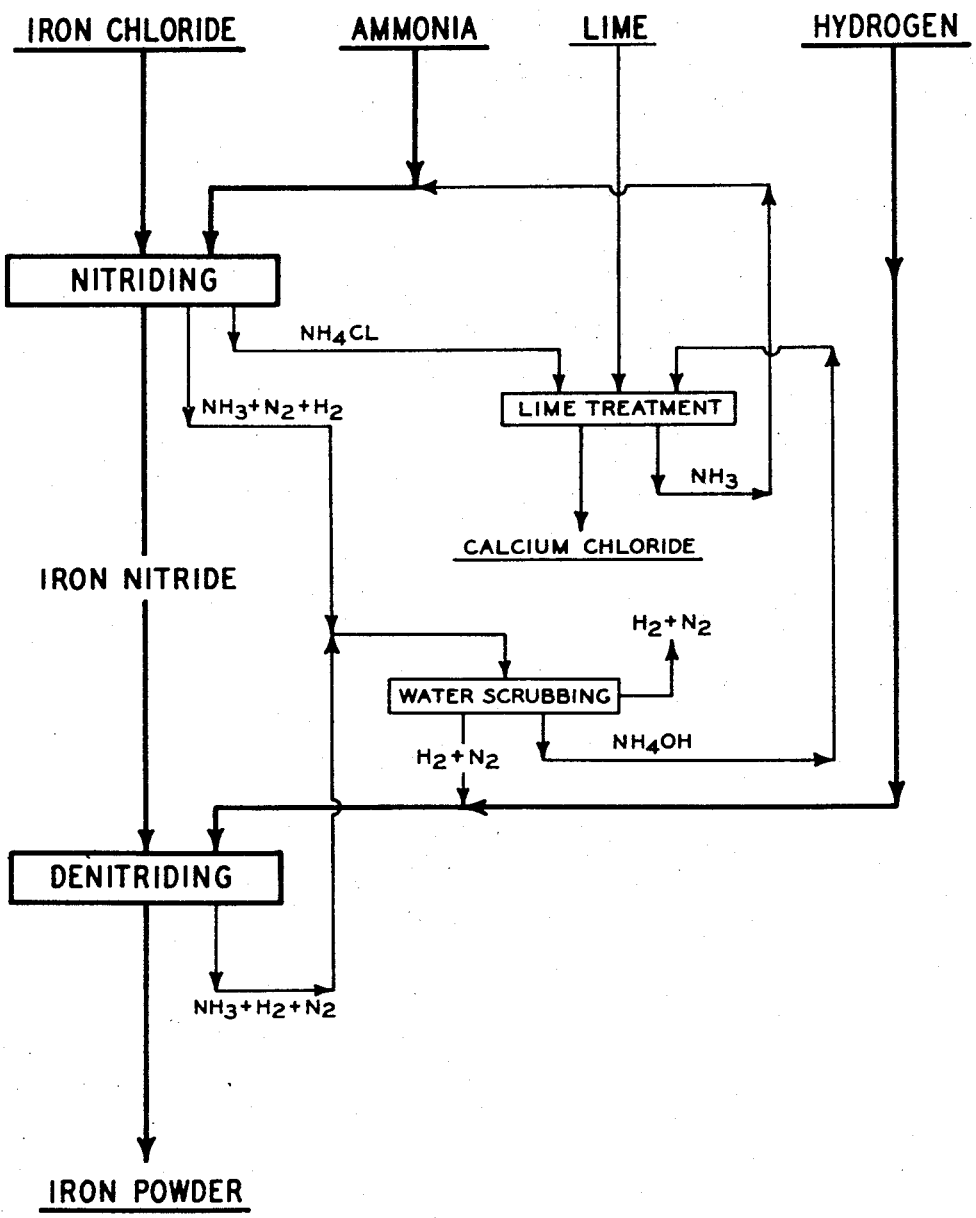
INVENTOR
WILLIAM J. KROLL
BY
D.C. Harrison
ATTORNEY Patented May 18, 1948

2,441,770

UNITED STATES PATENT OFFICE 2,441,770

PROCESS FOR MAKING IRON POWDER

William J. Kroll, Niagara Falls, N. Y.

Application November 11, 1944, Serial No. 563,050

4 Claims. (Cl. 75—34)

1

This invention relates to the production of metal powders. More particularly, the invention is a novel process for producing an iron powder having physical and chemical properties useful in powder metallurgy and other arts.

Iron powder is used extensively in the chemical and metallurgical arts, especially in the field of powder metallurgy, which is the forming of coherent articles, either compact or porous, from metal powders. The powdered iron is made by a variety of methods which yield powders of equally various purity, particle shape, apparent density, compressibility, and other properties affecting their utility in powder metallurgy. For some purposes, no high degree of purity or special physical properties are needed; but often it is necessary or desirable to use a pure, soft and ductile iron powder of high density, and such a product has heretofore been relatively expensive to make. An object of this invention is to provide a relatively inexpensive process, using readily available and inexpensive raw materials, for producing such pure, soft and ductile iron powder of high density.

The source of iron used in this invention is anhydrous ferrous chloride, obtainable in sufficiently pure form as a by-product of several industrial operations. It has heretofore been suggested that iron powder be prepared from ferrous chloride by reducing the latter with hydrogen at high temperatures to form iron and hydrogen chloride; but the problems involved in handling the hydrogen chloride at high temperatures have prevented any widespread adoption of the suggestion.

In accordance with this invention, anhydrous ferrous chloride is reacted with anhydrous ammonia at a temperature between 500° and 675° C., preferably between 520° and 625° C., to form iron nitride, ammonium chloride, and hydrogen; the iron nitride is separated from the other products of reaction; and the nitrogen is removed from the iron nitride at a temperature between 350° and 700° C. to form iron powder. Preferably, the ammonium chloride is treated, suitably with lime, to regenerate ammonia which is reused in the first step of the process.

The accompanying drawing is a flowsheet of a preferred process within this invention. The flow of the principal materials is indicated by heavy lines; the flow of material within the system for recovering, treating, and recycling by-products is indicated by lighter lines.

The step of treating ferrous chloride with ammonia (nitriding) may be carried out in non-

2 metallic refractory equipment, preferably at substantially atmospheric pressure. The optimum temperature is in the neighborhood of 600° C., where the stable nitride approaches $Fe_6N$ containing about 5% nitrogen. Lower temperatures are useful, down to about 500° C.; but to prevent the clogging of the furnace charge with ammonium chloride it is best to maintain the temperature above the sublimation point of ammonium chloride, which is 520° C. at normal atmospheric pressure. Temperatures above 600° C. are likewise useful; but it is best to operate below the melting point of ferrous chloride, which is about 675° C. In the presence of iron, ammonia dissociates to a great extent above 700° C., and the hydrogen so formed reacts with the ferrous chloride to form hydrochloric acid as mentioned above. For the foregoing reasons, the nitriding temperature must be maintained within the limits of 500° to 675° C.

The removal of nitrogen (denitriding) from the nitrided iron formed in the first step is carried out by heating the nitride at a temperature between 350° and 750° C. (preferably 650° to 725° C.) in a hydrogen atmosphere. It is advisable, particularly within the lower part of the range, to use an atmosphere of hydrogen at normal or only slightly subatmospheric pressure.

An advantage of a hydrogen atmosphere in the denitriding step is that, in the presence of hot iron powder, the hydrogen combines with atomic nitrogen to form ammonia which may be recovered and used in the nitriding step.

During the nitriding step some of the ammonia will dissociate, and the resulting hydrogen and nitrogen together with the hydrogen resulting from the nitriding reaction are withdrawn. To avoid free hydrochloric acid a slight excess of ammonia is maintained in the withdrawn gases. In the denitriding step in an atmosphere containing hydrogen, ammonia will be formed and will be removed with the nitrogen and excess hydrogen. The ammonia-containing gases from both steps are preferably scrubbed, for instance with water, to remove the ammonia. The scrubbed hydrogen-nitrogen mixture may be used in part to provide a hydrogen atmosphere for the denitriding step.

The ammonium chloride formed in the nitriding step may be condensed and collected and, with the ammoniacal scrub water obtained as just described, may be treated with lime (as in the Solvay process) to produce calcium chloride and ammonia. The ammonia so recovered may be returned to the nitriding step. If desired, the ammonium chloride may be reacted with dry lime. In the latter case, the ammonia in the scrub water may be recovered by merely heating the water.

Prolonged denitriding in hydrogen will lower the nitrogen content to a very low percentage, below 0.05%. Higher temperatures speed the denitriding. However, sintering temperatures customary in many powder metallurgy operations are effective to drive off practically all traces of nitrogen, so that an acceptable iron powder may initially contain as much as say 0.25% or somewhat more nitrogen. Denitriding to 0.25% nitrogen in the powder is readily and speedily accomplished under the conditions of the process of this invention. For instance, a product of the nitriding step containing 4.8% nitrogen was treated for one-half hour by slowly heating it to 700° C. in a stream of hydrogen at atmospheric pressure, whereupon the denitrided product was found to contain only 0.25% nitrogen.

The iron nitride formed in the first step is brittle and friable, and may easily be crushed, to any particle size desired, before denitriding.

The product of the denitriding step is pure, soft, and ductile, compressible, and dense. Its average apparent density is about 2.95 grams per cubic centimeter, which may be compared to a typical value of 2.56 grams per cubic centimeter for iron powder produced by the electrolysis of aqueous solutions. A typical analysis is: 0.03% C, 0.02% Si, 0.075% Mn, 0.001% P, 0.01% S, 0.03% Cl, 0.25 N. By sintering in hydrogen at 1100° C. for one-half hour, the nitrogen content of this specific example was dropped to 0.011% and chlorine was eliminated. When compressed at 26,000 pounds per square inch, the apparent density of this material was 6.3 grams per cubic centimeter, slightly higher than is usually expected in the case of electrolytic (aqueous electrolysis) iron powder compressed at 50,000 pounds per square inch. When compressed at 52,000 pounds per square inch, the product of this invention had an apparent density of 7.3 grams per cubic centimeter.

Iron powder produced by the method of this invention is well adapted for pressing and sintering to strong, compact form. For instance, in parallel tests, samples of such powder (A) and samples of a high-quality iron powder (B) produced by aqueous electrolysis were briquetted while cold, then sintered for one-half hour at 1100° C. in hydrogen. Tensile tests on the respective sintered products gave the following results:

|  | 50,000 lb./sq. in. Briquetting Pressure | | 100,000 lb./sq. in. Briquetting Pressure | |
| --- | --- | --- | --- | --- |
|  | A | B | A | B |
| Yield point, lb./sq. in | 10,400 | 11,150 | 15,680 | 14,880 |
| Ultimate strength, lb./sq. in | 18,350 | 15,120 | 29,550 | 27,700 |
| Per cent elongation | 10.2 | 6.0 | 19.0 | 14.0 |

The outstanding feature of the values in the foregoing table is the greater ductility of the compacts made from the iron powder (A) made according to this invention. The strength is of the same order, but significant superiority is shown by the material made according to the invention.

I claim:
1. Process for making iron powder which comprises nitriding ferrous chloride in an ammonia atmosphere to form iron nitride and ammonium chloride; recovering ammonia from such ammonium chloride and returning the ammonia to the first-mentioned step and thereafter decomposing said iron nitride in an atmosphere of hydrogen to form iron powder and ammonia; and returning such last-mentioned ammonia to the first-mentioned step.

2. Process for making iron powder which comprises treating substantially anhydrous ferrous chloride with an excess of ammonia at a temperature between 520° C. and 625° C. to form iron nitride and to form and sublime ammonium chloride while avoiding free hydrogen chloride; separating said iron nitride from said ammonium chloride; recovering ammonia from such ammonium chloride and returning the ammonia to the first-mentioned step; and heating said nitride at a temperature between 350° C. and 750° C. in an atmosphere of hydrogen to form iron powder and ammonia; and returning such last-mentioned ammonia to the first-mentioned step.

3. Process as claimed in claim 2, wherein said iron nitride is crushed before the denitriding step.

4. Process for making iron powder which comprises treating substantially anhydrous ferrous chloride with ammonia at a temperature between 520° C. and 625° C. to form and sublime ammonium chloride and to form iron nitride; condensing said ammonium chloride apart from said nitride, reacting said ammonium chloride with lime to regenerate ammonia and returning such ammonia to the first-mentioned step; heating said nitride at a temperature between 650° C. and 725° C. in an atmosphere of hydrogen to form iron powder and ammonia, and returning such last-mentioned ammonia to the first-mentioned step.

WILLIAM J. KROLL.

REFERENCES CITED

The following references are of record in the file of this patent:

UNITED STATES PATENTS

| Number | Name | Date |
| --- | --- | --- |
| 2,035,955 | Foss | Mar. 31, 1936 |

OTHER REFERENCES

A comprehensive Treatise on Inorganic and Theoretical Chemistry, vol. 8, pages 133, 134, and 135; published in 1928 by Longmans, Green and Co., New York.